United States Patent [19]

Krawetz

[11] 3,828,274

[45] *Aug. 6, 1974

[54] ELECTRON BEAM-PUMPED GAS LASER SYSTEM

[75] Inventor: Barton Krawetz, Livermore, Calif.

[73] Assignee: The United States of America as represented by the United States Atomic Energy Commission, Washington, D.C.

[ * ] Notice: The portion of the term of this patent subsequent to Feb. 8, 1999, has been disclaimed.

[22] Filed: Nov. 5, 1971

[21] Appl. No.: 196,076

Related U.S. Application Data

[63] Continuation of Ser. No. 40,037, May 25, 1970.

[52] U.S. Cl. ............................. 331/94.5, 330/4.3
[51] Int. Cl. ............................................. H01s 3/22
[58] Field of Search...................... 331/94.5; 330/4.3

[56] References Cited
OTHER PUBLICATIONS

Tien, et al., Physical Rev. Letters, 12(1), Jan. 6, 1964, pp. 30–33.

Hammer et al., Applied Physics Letters, 1,(6), Sept. 15, 1965, pp. 59–61.

Lax, IEEE Spectrum, July 1963, pp. 62, 66–79 and 75.

Dumanchin et al., Comptes Rendus Ac. Sci. de Paris, 269, Nov. 3, 1969, pp. 916–917.

Primary Examiner—Ronald L. Wibert
Assistant Examiner—R. J. Webster
Attorney, Agent, or Firm—John A. Horan; F. A. Robertson; L. E. Carnahan

[57] ABSTRACT

A high power electron beam-initiated electrical-discharge gas laser system including a gaseous lasing medium placed in an optical cavity contained in a vessel having two large electrodes electrically insulated from each other; and a charged particle acclerator directing an electron beam through the gaseous medium perpendicular or parallel to the optical path. The system is capable of producing pulses having a total energy content on the order of about 20,000 joules, with the energy released or delivered in 0.5 $\mu$sec., giving a power rating on the order of about $10^4$ megawatts.

4 Claims, 1 Drawing Figure

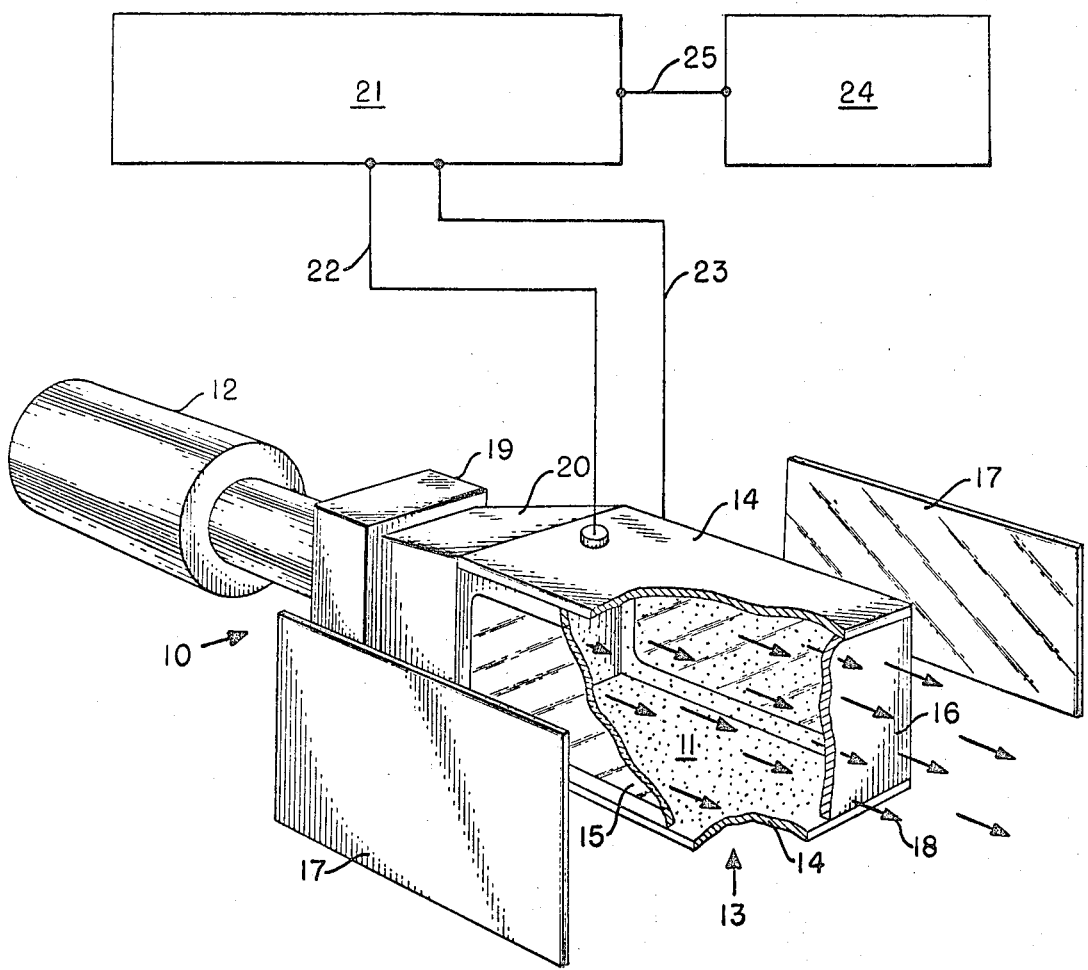
INVENTOR
BARTON KRAWETZ

ELECTRON BEAM-PUMPED GAS LASER SYSTEM

RELATED APPLICATIONS

This application is a continuation of application Ser. No. 40,037, filed May 25, 1970.

BACKGROUND OF THE INVENTION

The invention described herein was made in the course of, or under, Contract No. W-7405-ENG-48 with the U.S. Atomic Energy Commission.

Gas lasers are ideal for high energy applications in that a gas lasing medium is not damaged by the intense light beam. However, it is difficult to obtain and maintain a large population inversion in a lasing energy state of a gaseous medium. For example, optical pumps such as flashlamps simply cannot transfer enough energy in a sufficiently short time to create a large population inversion in a gas.

At the present time, as known in the art, electrical discharge excitation is the most efficient technique for pumping a gaseous lasing medium. In an electrical discharge, the lasing gas is both directly excited by electron collision and excited by resonant energy transfer from a second gas excited by electron collision. However, uniform, stable electrical discharge exist only at low (vacuum) pressures. Hence the energy density of a gas laser system is relatively low.

SUMMARY OF THE INVENTION

The present invention overcomes the disadvantages of the prior known gas laser systems by providing a high power, high pressure gas laser system wherein an energetic charged particle pulse from an accelerating device is directed through a gaseous medium to initiate a uniform electrical discharge between large effective surface area electrodes. Due to the very short time-width and uniformity of the charged particle pulse and the triggered discharge, extremely large quantities of energy can be uniformly delivered to the lasing medium with very small net free electron displacement.

Therefore, it is an object of this invention to provide an electron beam-initiated electrical-discharge laser system.

A further object of the invention is to provide a high power, high pressure gas laser system.

Another object of the invention is to provide a gas laser system wherein extremely large quantities of energy can be uniformily delivered to a lasing medium with very small net free electron displacement.

Another object of the invention is to provide a gas laser system wherein an energetic charged particle pulse from an accelerating device is directed through a gaseous medium to initiate a uniform electrical discharge between two large effective surface area electrodes.

Another object of the invention is to provide a high power, high pressure gas laser system having a very short time-width and uniformity of a charged particle pulse and a triggered discharge so as to provide large quantities of energy uniformly delivered to the lasing medium with a very small net free electron displacement.

Another object of the invention is to provide a gas laser system capable of producing light pulses having an average energy content on the order of about 20,000 joules, with a total pulse duration on the order of about 0.5 $\mu$sec., giving a pulse power rating on the order of $10^4$ megawatts.

Other objects of the invention will become readily apparent to those skilled in the art from the following description and accompanying drawing.

BRIEF DESCRIPTION OF THE DRAWING

The single FIGURE illustrates an embodiment for carrying out the invention in an oscillator configuration wherein the electron beam is directed through the gaseous medium perpendicular to the optical path.

DESCRIPTION OF THE INVENTION

Prior to the detailed description of the illustrated embodiment, a more general, description of the invention is set forth. The inventive high power electron beam-pumped gas laser system includes a gaseous lasing medium placed in an optical cavity contained in a vessel having large electrodes electrically insulated from each other; and a charged particle accelerator directing an electron beam through the gaseous medium perpendicular or parallel to the optical path. A large capacitor bank is electrically connected across the electrodes. The beam cross section approximately equals the cross-section of the containment vessel. The voltage impressed between the electrodes is slightly less than the breakdown voltage of the gas lasing medium. To induce lasing, a high energy, short time-width particle pulse from the accelerator uniformly ionizes the gas medium, thereby initiating the capacitive discharge between the large surface area plate electrodes. The triggering particle pulse and the triggered electrical discharge excite the gaseous medium, creating a large population inversion in the energy states of of the lasing species. Either spontaneous emission or the presence of an oscillator pulse initiates the lasing action. The system is capable of generating laser pulses having a total energy content on the order of about 20,000 joules, whereby the energy is released or delivered in 0.5 $\mu$sec., giving a power rating on the order of about $10^4$ megawatts.

Referring now to the drawing, the illustrated embodiment of the inventive electron beam-initiated electrical-discharge high energy gas laser system in an oscillator configuration generally indicated at 10, basically includes a pulsed electron accelerator 12, and a pressure or containment vessel or housing 13 formed of two large effective surface area plate electrodes 14, constructed of copper for example, two opposite insulating sidewalls 15 transparent to light; constructed of sodium chloride for example, and two opposite end walls 16 (only one shown) transparent to high energy electrons, constructed, for example from any metal foil, such as aluminum, capable of withstanding the pressures involved. The vessel 13 contains a pressurized, gaseous lasing medium 11, such as, for example, $CO_2$-$N_2$-He mixture. A pair of mirrors 17 (for example, one having 100 percent reflectivity capability and the other adjusted in reflectivity to give maximum laser output) are positioned on each side of vessel 13 and spaced from sidewalls 15 and define an optical cavity between the plate electrodes 14. However, mirrors 17, may, if desired, be placed within the vessel integral with the vessel walls, or external but against the vessel. The vessel 13 is placed in an electron beam path from accelerator 12 as indicated at 18 and illustrated by the arrows. A conventional means 19, such as beam manipulation devices using magnetic fields or scattering films, is positioned between acclerator 12 and vessel 13 to disperse the electron beam 18 such that it has the same cross sectional area as the pressure vessel 13. Means 19 is connected to vessel 13 via a tapered portion 20. A capacitor bank 21 is electrically connected via leads 21 and 22 to the plate electrodes 14. Conventional power supply means 23 charges the capacitor bank 21 via appropriate connection indicated at 24.

In operation, the capacitor bank 21 is charged via means 23 until the voltage impressed across the electrodes 14 is slightly less than the breakdown voltage of the gaseous lasing medium 11 within vessel 13. A short, high energy (of the order of the rest energy of the electron) electron pulse or beam 18 is generated by the accelerator 12. The beam 18 passes through the means 19 where it is dispersed to the same cross sectional area as vessel 13 and passes through the gaseous lasing medium 11 with approximately the speed of light, ionizing it slightly by electron collision, triggering a large, uniform electrical discharge between the plate electrodes 14. Both the electron pulse 18 and the triggered electrical discharge of electrodes 14 excite the lasing medium, creating a large population inversion. Specifically, for the $CO_2$-$N_2$-He lasing gas mixture, as exemplary, the beam electrons and discharge electrons excite the $CO_2$, $N_2$ and He to high energy states by collision. The excited $N_2$ resonantly transfers energy to unexcited $CO_2$. Accordingly, a population inversion is generated in the lasing energy state of the $CO_2$ modecules. Spontaneous emission from the excited $CO_2$ initiates lasing. An example of the composition of the lasing mixture may be 40% $CO_2$, 50% $N_2$, and 10% He by volume.

For purpose of example only, and with the lasing medium being a $CO_2$-$N_2$-He mixture, the electric field between the plate electrodes 14 by capacitor bank 21 is about 5 KV/cm, with the energy of the electron pulse from accelerator 12 being about 300 joules.

Laser pulses having a total energy content on the order of about 20,000 joules may be generated in this manner. The energy is released or delivered in about 0.5 $\mu$sec., giving a power rating on the order of about $10^4$ megawatts.

It is thus shown that the inventive electron beam-initiated electrical-discharge gas laser system destinguishes over the prior known electrical discharge-pumped gas laser in that the lasing medium is a high pressure gas disposed between plate electrodes. The lasing medium is pumped by triggering a uniform discharge between the electrodes with a high energy electron beam pulse. Accordingly, very short timewidths (about 0.5 $\mu$sec.) pumping pulses are possible. Whereby, the total laser energy output per pulse of the inventive system is at least three orders of magnitude greater than the prior known lasing systems.

Although the illustrated embodiment utilizes an electron beam which passes through the gaseous lasing medium perpendicular to the optical path (between mirrors 17), the beam can be directed through the medium in a direction parallel to the optical path, and it is not intended to limit the direction of the beam with respect to the optical path to that specifically illustrated.

While the electrodes have been illustrated and described as flat plates, if desirable, an array of ballested, field emitting points electrically interconnected may be utilized in place of each of the platelike electrodes.

The embodiment illustrated is an oscillator configuration, although the inventive concept will function equally well as an amplifier configuration by eliminating the mirrors, providing a light path through transparent walls 15 and lasing medium 11 so that when gain appears, an external oscillator pulse can be amplified by passage through this hi-gain medium.

While a particular embodiment for carrying out the invention has been illustrated, modifications and changes will become apparent to those skilled in the art, and it is intended to cover in the appended claims all such modifications and changes as come within the spirit and scope of the invention.

What I claim is:

1. An electron beam-initiated electrical-discharge gas laser system comprising: means defining a containment vessel; a gaseous lasing medium under high pressure contained in said containment vessel; electron accelerator means operatively connected to said containment vessel through an electron beam dispersing means for directing beams of high energy electron pulses through said containment vessel, said electron beam dispersing means utilized for dispersing the electron pulses from said accelerator means to conform substantially with the cross-sectional area of said containment vessel; said containment vessel including a pair of oppositely positioned electrically conductive members defining large effective area plate-like electrodes forming a pair of walls of said containment vessel, a pair of oppositely positioned insulating walls transparent to light connected with said first-mentioned pair of walls, and a pair of oppositely positioned walls transparent to high energy electrons connected with both said pair of walls; means operatively connected to said large effective area plate-like electrodes for impressing across the electrodes a voltage less than the breakdown voltage of said pressurized gaseous medium contained within said vessel; and means providing a light path through said pair of light transparent walls and said pressurized gaseous medium within said vessel; whereby beams of electron pulses from said accelerator, dispersed by said dispersing means, passes through said gaseous medium ionizing it slightly and triggering a large uniform electrical discharge between said electrodes exciting the medium and creating a large population inversion producing a hi-gain medium thereby amplifying light passing through said light transparent walls of said vessel and said hi-gain medium contained within said vessel.

2. The system defined in claim 1, wherein said electrodes are constructed of copper, said light transparent walls are constructed of sodium chloride, and said electron transparent walls are constructed of suitable metal foil.

3. The system defined in claim 1, wherein said voltage impressing means includes a capacitor bank, and means for charging the capacitor bank.

4. The system defined in claim 1, wherein said gaseous medium consists essentially of a mixture of $CO_2$, $N_2$ and He.

* * * * *